United States Patent [19]

Miro

[11] Patent Number: 5,220,653
[45] Date of Patent: Jun. 15, 1993

[54] SCHEDULING INPUT/OUTPUT OPERATIONS IN MULTITASKING SYSTEMS

[75] Inventor: Felix Miro, Cooper City, Fla.

[73] Assignee: International Business Machines Corporation, Armonk, N.Y.

[21] Appl. No.: 605,054

[22] Filed: Oct. 26, 1990

[51] Int. Cl.⁵ .......................................... G06F 13/00
[52] U.S. Cl. .................................. 395/275; 395/325; 395/425; 395/650; 364/DIG. 1; 364/238.4; 364/248; 364/246.3; 364/248.1; 364/256.8; 364/260; 364/260.1; 364/271.3; 364/271.6
[58] Field of Search ............... 395/650, 425, 275, 200, 395/250, 650, 325, 700, 800; 364/200.39

[56] References Cited
U.S. PATENT DOCUMENTS

| | | | |
|---|---|---|---|
| 4,525,780 | 6/1985 | Bratt et al. | 395/425 |
| 4,584,644 | 4/1986 | Larner | 395/650 |
| 4,635,187 | 1/1987 | Baron et al. | 395/650 |
| 4,658,351 | 4/1987 | Teng | 395/650 |
| 4,688,167 | 8/1987 | Agarwal | 364/200 |
| 4,713,754 | 12/1987 | Agarwal et al. | 364/200 |
| 4,779,194 | 10/1988 | Jennigs et al. | 395/650 |
| 4,807,142 | 2/1989 | Agarwal | 364/200 |
| 4,908,750 | 3/1990 | Jablow | 395/650 |
| 4,980,824 | 12/1990 | Tulpule et al. | 395/650 |
| 5,148,542 | 5/1992 | Sakuma | 395/700 |

Primary Examiner—Michael R. Fleming
Assistant Examiner—Tariq Rafiq Hafiz
Attorney, Agent, or Firm—Bruce D. Jobse; Robert Lieber

[57] ABSTRACT

In a multitasking data processing system, I/O requests to a disk drive are staged in holding queues from which they are transferred to a service queue. Requests in the latter queue are directly serviced on a FIFO basis by a device driver module running on the system. The system maintains a set of holding queues and an associated service queue separately for each physical drive in the system. Holding queues in each set are prioritized in accordance with base priorities of tasks, and I/O requests to disk drives are entered into associated holding queues having priorities corresponding to those of task threads for which such requests are originated. Prioritization of the holding queues, and a starvation advancement process performed to advance "oldest" enqueued requests to higher priority holding queues, causes the requests to be presented to the disk drive in a sequence based in part on respective task priorities and in part on "fairness" servicing of "service starved" requests. A selection operation in respect to certain transfers from the holding queuest to the service queues orders selection of transferred requests on the basis of relative proximity of disk addresses in the queued requests to current positions of the read/write head assembly in the associated disk drive.

8 Claims, 6 Drawing Sheets

\* Above are double linked list queues

(Prior Art)

Fig. 3

Single linked list queue, RBA's elevator ordered
(RBA's are Relative Block Addresses)

* Above are double linked list queues

Fig. 7 (TC, RG & IDLE Q's)

Fig. 8 (FIFO Holding Q)

Receives requests only via "starvation boost" process (Fig. 10) from lower priority hold Q

SCHEDULING INPUT/OUTPUT OPERATIONS IN MULTITASKING SYSTEMS

FIELD OF THE INVENTION

This invention relates to multitasking data processing systems, and particularly to the scheduling of input/output functions relative to disk storage devices in such systems.

TERMINOLOGY

Terms which may be used frequently herein are defined below. Additional information regarding respective functions is contained in the publication IBM Operating System/2[1] Programming Tools and Information, Version 1.2 Programming Guide, 1989. Operating System/2 is also referred to herein as OS/2.

[1] IBM and OS/2 are Trademarks of the International Business Machines Corporation API (Application Programming Interface)—a programming interface between an operating system and application programs.

Device Driver—a program which performs operations to control a peripheral device; e.g. to direct transfers of data relative to a disk storage device.

Foreground Program—a program with which a user of a multitasking system is currently interacting.

Linked list queue—a linearly ordered queue of data items in which positions of consecutive items are indicated by pointer information in the items. In a single linked list item pointers point only to consecutive items in one direction, while in a double linked list queue item pointers point bidirectionally.

Multitasking—concurrent processing of applications or parts of applications in a data processing system.

RBA (Relative Block Address)—a number defining a storage location on a disk storage device. Magnitudes of such numbers are directly relatable to track and cylinder locations on the device.

Service Kernel—an OS/2 module, operating between API's and device drivers, to service requests initiated by program tasks.

Service Queue—a queue maintained by the operating system and a disk device driver, relative to an associated disk drive device, for ordering I/O functions performed by the device.

Task Request Packet—unit of request information passed from a program task to the operating system service kernel for initiating a required action such as I/O service.

Thread—a unit of execution within a task or process.

BACKGROUND OF THE INVENTION

In contemporary multitasking data processing systems, operating systems, for instance, systems operating under operating system OS/2 versions 1.0, 1.1 and 1.2, input/output (I/O) operations relative to disk storage devices are scheduled in sequences which are essentially unrelated to the relative time urgencies of tasks waiting for such functions to be carried out.

For example, in OS/2 Versions 1.0, 1.1, and 1.2, I/O activities relative to a disk device are ordered in an "elevator" sequence in which I/O requests are arranged in an associated service queue in a positional sequence designed to allow servicing of all enqueued requests having targeted storage locations reachable while the read/write head of the disk is continuing in its present direction of motion. This is analogous to the familiar sequence followed by building elevators, wherein an elevator car moving upward continues upward to all selected floors, ignoring calls for service from floors which have been passed, and an elevator car moving downward stops at all selected floors ignoring calls for service from higher floors which it has passed. Similarly, in prior art OS/2 system disk I/O requests are enqueued alternately in sequences of increasing and decreasing associated RBA (relative block address) values representing their targeted disk storage locations.

In such systems, I/O requests directed to a specific disk drive are held in a single linked list service queue associated with that drive. The next request to be served is always the one located at the head end of the queue. While the R/W (read/write) head of the associated drive is moving in a direction of increasing RBA locations relative to the disk, requests designating RBA locations reachable in that direction (not yet passed by the head) are positioned in the queue in a sequence of increasing RBA's starting at the head end, and requests designating RBA locations reachable only after a reversal of R/W head direction are arranged further along the queue in a sequence of decreasing RBA's. When the operating system service kernel responsible for placing requests in the queue receives another request designating the same drive, it determines the present position and direction of movement of the R/W head (from the RBA's of the last 2 requests removed from the queue for service) and places the received request into the queue in a position for it to receive "elevator sequence" service in line with other enqueued requests.

Thus, if the R/W head is moving in the direction of increasing RBA disk locations, and a request at the head end of the service queue has an RBA representing a disk location reachable without reversing the direction of R/W head movement, all enqueued requests having such reachable RBA's are enqueued in a block having progressively ascending request RBA values starting at the head end of the queue. Any newly presented request having an RBA representing a location reachable without a change in R/W head direction is inserted into the head end block so as to maintain the ascending order of request RBA's in the block. A new request having an RBA representing a location already passed by the head is placed in a second block in which the request RBA's are ordered in descending sequence. Thus, after all requests in the first block have been serviced, the direction of the R/W head will be reversed and requests in the second block will receive service consecutively.

Although such "elevator" ordering effectively guarantees that all requests will be serviced, it does not ensure efficient service since the priorities of tasks with which such requests are associated are not given any consideration. Thus, disk I/O requests having real-time association with a human heart operation stand to receive no better service than requests associated with continuation of a recreational game. Furthermore, since the rate of presentation of disk I/O requests in any system tends to increase in inverse relation to memory constraints (i.e. the smaller the system memory, the more frequent the access to disks) and in direct relation to the number of tasks concurrently processed, it is clear that in an efficiently utilized multitasking system with small memory capacity, the average delay in servicing disk I/O requests could become so large as to require system users to place undesirable constraints on their use of the system.

OBJECTS OF THE INVENTION

Accordingly, an object of the present invention is to provide an improved method and means for scheduling disk I/O operations in a multitasking data processing system. A related object is to provide such scheduling wherein servicing of requests associated with high priority tasks is advanced over requests associated with low priority tasks.

Another object is to provide improved scheduling of disk I/O operations in a multitasking system, with favored servicing of requests associated with high priority tasks over requests associated with low priority tasks, but wherein low priority tasks are not unduly "service starved" (blocked from service for excessive delay times).

Another object is to prioritize the servicing of I/O requests in such systems in accordance with respective task priorities while giving preferential treatment to requests associated with foreground tasks over requests associated with non-foreground tasks.

Another object is to prioritize servicing of disk I/O requests in such systems in a manner such that requests enqueued for service, relative to tasks having corresponding priorities, are ordered in the queue and selected for service in a special order tending to speed up the overall throughput of request servicing.

Another object is to provide a method and means for prioritizing servicing of disk I/O requests which, for a system with modest memory capacity and relatively high task load, would provide faster throughput of service to all requests than a comparably configured system in which requests are serviced in an elevator sequence.

SUMMARY OF THE INVENTION

These and other objects of the present invention are realized presently by providing a set of priority ordered request holding queues relative to each physical disk drive in a processing system (hard drive, floppy drive, etc.). Requests directed to a given drive are entered into holding queues having service priorities corresponding to priority classes of tasks with which such requests are associated. Each queue is a double linked list queue, and requests placed in each are positioned to order their associated RBA (relative block address) values (which define storage locations on the drive respectively targeted for I/O action) in a progressively increasing sequence relative to one end of the queue.

When a last request on the service queue is dispatched to the disk drive, a request is transferred from a highest priority holding queue "ready" to be served (not empty) to the service queue. When the highest priority "ready" queue is other than the highest priority holding queue (herein termed the FIFO holding queue), a single request is transferred from a selected one of the two ends of the respective ready queue. The selection is based on a "proximity" determination between the RBA's of the 2 end requests and the present position of the disk read/write head (the latter inferred from the RBA of the request last dispatched from the service queue).

In a preferred embodiment of the invention, a set of 10 holding queues is assigned to each physical disk drive. In each set, 9 of the 10 queues are ordered in association with 9 different groups of priority classes assignable to tasks. The remaining queue is a highest priority FIFO holding queue mentioned above. The FIFO holding queue receives requests only from lower priority queues during a specialized "starvation boosting" process considered unique to the present invention. In that process, when a determination is made that an "oldest" request in a holding queue has been enqueued for longer than a predetermined "starvation time", all requests in that queue are transferred in a block to a next higher priority holding queue which is either the next higher priority empty holding queue or the FIFO holding queue if all intermediate priority holding queues are not empty. If the holding queue is not empty prior to a request transfer, the transferred requests are concatenated to the request at the tail end of the FIFO queue.

The foregoing queues are managed by a service kernel of the operating system. When the disk drive is ready for an I/O operation, the service kernel is alerted by the associated device driver, and dispatches the next request on the service queue (the requests are dispatched in FIFO sequence from that queue). If the service queue is empty after a request is dispatched, and the holding queues are not empty, the service kernel transfers one or more requests from the highest priority non-empty holding queue to the service queue. If the FIFO holding queue is not empty, all requests in that queue are transferred in a block to the service queue. If the FIFO queue is empty when the service queue becomes empty, and any lower priority holding queue is not then empty, a single request is transferred to the service queue from the non-empty holding queue next highest in priority relative to the FIFO holding queue. If that next highest priority queue contains more than one request, RBA's designated in the requests at the head and tail ends of that queue are compared to the current R/W head position and the request having an RBA closest to that position is selected. In the preferred embodiment, the compared request RBA's are "end RBA's" (the RBA specified in the request increased by the file length specified in the request) and the request selected is the one having the closest end RBA value.

Requests entered into each holding queue other than the FIFO holding queue are positionally ordered to maintain a progressively ascending sequence of request RBA's beginning at one end of the queue (the head end in the embodiment to be described). Thus, requests in the FIFO holding queue consist of one or more blocks of requests transferred from lower priority holding queues, requests in each block positioned to maintain progressive linear ordering of their RBA's (e.g. ascending order in the embodiment to be described).

Each disk I/O request presented to the service kernel of the operating system contains a priority indication corresponding to the base priority class of the associated task. The service kernel places each request into a selected one of the selected queue in the set of holding queues associated with the targeted disk drive. The selected queue is one having a priority either corresponding to or higher than that of the priority indication in the task (but not the FIFO holding queue). I/O requests associated with foreground tasks are placed in a holding queue of corresponding or higher priority, whereas I/O requests associated with non-foreground tasks are placed only in a holding queue of corresponding priority. Thus, relative to tasks of a given priority class, I/O requests associated with foreground tasks tend to receive more favorable service than requests associated with non-foreground tasks.

A feature of the present hierarchical arrangement of priority holding queues, with linear RBA positional ordering in each queue, is that requests are effectively prioritized for service in accordance with priority classes of associated tasks and selectable for service based on relative proximity of end RBA's to the disk R/W head; so that only the two requests most quickly locatable in any queue need be examined for selection.

All of the foregoing features in combination serve to improve task processing throughput significantly, relative to comparably configured systems employing the prior art "elevator sequence".

In the preferred embodiment, the holding queues in each set with service priority ranking intermediate the highest (FIFO) and lowest (IDLE) levels, include a subset of time critical (TC) queues and a subset of regular (RG) priority queues. The TC queues are ranked higher in priority for device driver service than the RG queues. The TC and RG queues respectively receive requests associated with tasks having time critical and regular non-critical priority classifications. Requests sent to the IDLE holding queue are those associated with tasks having non-critical priority classifications lower than regular non-critical.

The foregoing arrangement of prioritized holding queues, in combination with the "starvation" handling process mentioned above and the request RBA ordering and head/tail proximity selection as characterized above, appear to provide optimum efficiency of request servicing with associated optimum improvement in overall task processing throughput. With this arrangement, throughput increases on the order of 3 to 5 percent are obtainable (relative to comparably configured systems using the "elevator" arrangement of I/O request servicing described above).

The foregoing and other features, objects, aspects, and advantages of the present invention will be more fully understood and appreciated by considering the following detailed description and claims.

DETAILED DESCRIPTION

1. System Environment

Figure 1:
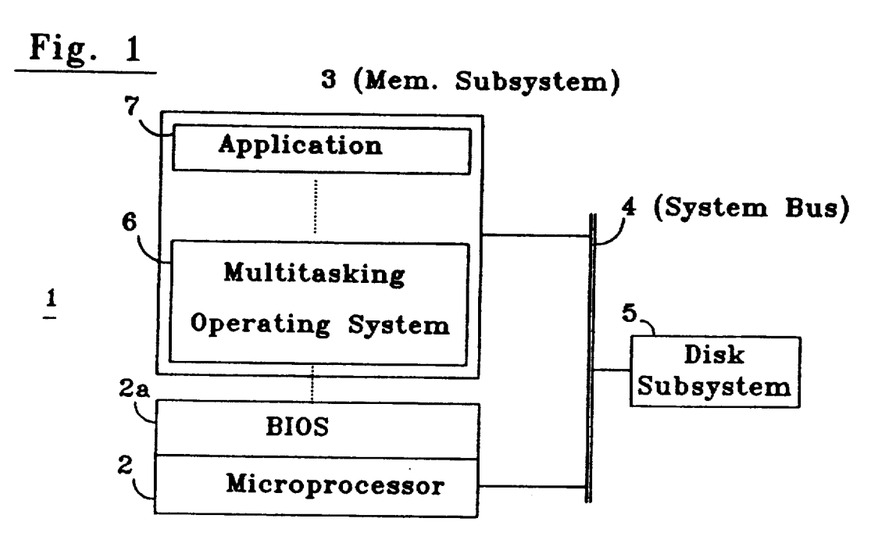
FIG. 1 illustrates a typical prior art data processing system environment in which the present invention may be advantageously applied.

Referring to FIG. 1, a typical multitasking data processing system environment 1, in which the present invention can be used advantageously, comprises a microprocessor 2, a memory subsystem 3 (typically, comprising one or more banks of random access memory, and a not-shown direct memory access controller), a bus 4 and a disk storage subsystem 5 (typically comprising a controller not-shown and one or more disk drives). Associated with microprocessor 2 is Basic Input Output System (BIOS) "firmware" 2a of well known form, which may be stored in a read only memory (ROM) portion of the memory address space associated with subsystem 3. In a manner well-known in the art, bus 4 links elements 1-3, and 5 for exchange of information signals. Not-shown are user input devices typical of such systems (keyboard, mouse, etc.) and other system elements not considered relevant to an understanding of the present invention.

At system start-up, a multitasking operating system program 6, such as one of the existing versions of the OS/2 system, is loaded into memory subsystem 3 for managing utilization of disk storage space in subsystem 5 and movement of information between that subsystem 5 and memory subsystem 3. The operating system operates to provide dynamic transfer of programs and data between storage subsystem 5 and memory subsystem 3 in a manner permitting the microprocessor to be operated in a multitasking mode.

2. Handling of Disk I/O Requests By Prior Art Multitasking Operating Systems

Figure 2:
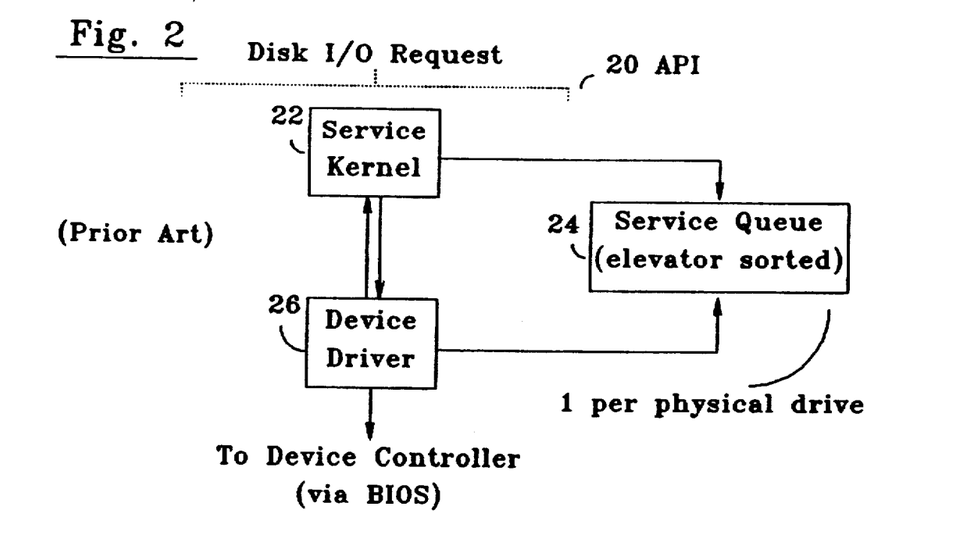
FIGS. 2-4 are used to illustrate by specific example the prior art servicing of disk I/O requests in "elevator" sequence as broadly explained above.
Figure 3:
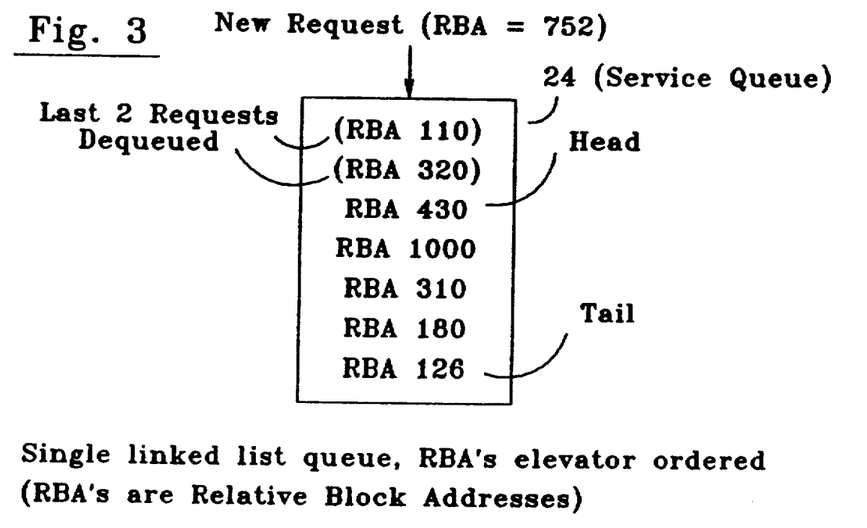
Figure 4:
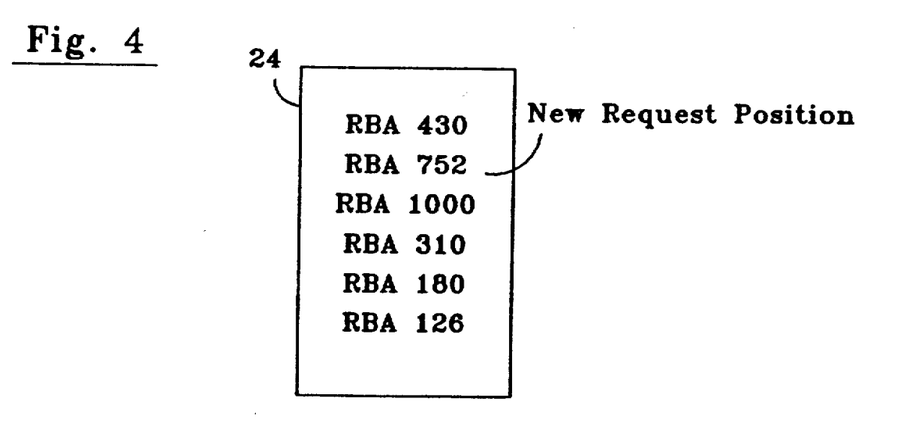

FIGS. 2-4 illustrate the above-mentioned prior art "elevator" ordering of disk I/O requests in accordance with existing versions of the OS/2 system. In these O/S2 systems, application programs and utilities interface to the operating system through an application programming interface (API) 20. Disk I/O requests from the applications and utilities are passed through the API to a service kernel 22 of the operating system. Kernel 22 places each request into a service queue 24 associated with the disk drive device designated in the request. A separate service queue is maintained relative to each physical disk drive (hard file, floppy disk, etc.) in subsystem 5. Requests are fetched from queue 24 one at a time, in response to "device ready" indications from the device driver software module 26 associated with the respective drive, and dispatched to a not-shown controller of the designated disk drive (via BIOS).

FIGS. 3 and 4 provide a simplified illustration of how requests in prior art queue structure 24 are sortably positioned and serviced in "elevator sequence". The service queue 24 in these prior art systems is constructed as a single linked list queue into which requests are sortably placed by the service kernel, and from the head end of which requests are dispatched one at a time by the service kernel for action by the device. When service queue 24 is empty, the next request received by the service kernel relative to the associated device is placed at the head end of the service queue. If the queue is not empty when a next request is received, the service kernel places that request at a position in the queue determined by the relation between the RBA designated by that request and the RBA's designated by requests already in the queue, the latter RBA's implying direction of movement of the associated disk drive's R/W head.

The received request is positioned in the service queue so as to maintain servicing of the enqueued requests in "elevator" sequence; i.e. so as to ensure that all enqueued requests having RBA's reachable by the R/W head without reversing its direction of movement will be serviced during movement of the head in its present direction and to ensure that enqueued requests having RBA's reachable in the reverse direction will be consecutively serviced after the direction R/W head movement is reversed.

In the example shown in FIGS. 3 and 4, the R/W head is assumed to be moving in the direction of increasing RBA's (since the RBA of the last dequeued request was 320 and the RBA of the previously removed request was 110), and the service queue is assumed to contain 5 unserviced requests. Two of the unserviced requests have RBA's with values of 430 and 1000, which represent storage locations reachable by the R/W head from its present position (at or beyond RBA 320) without a change of direction, and the other 3 requests have RBA's with values lower than 320 (specifically RBA values 126, 180 and 310) representing storage locations which cannot be reached without changing R/W head direction.

Notice that the requests having RBA's reachable in the present "ascending" direction of head movement are positioned in the queue with their RBA values forming a progressively ascending sequence "430, 1000", while the requests having RBA's not reachable without a change in R/W head direction are positioned in the queue with their RBA's arranged in a progressively descending sequence "310, 180, 126". Thus, if no more requests were placed in the queue the 2 requests closest to the head end would be dispatched to the disk while the R/W head is moving in its present ascending RBA direction, and the dispatch of the first of the three remaining requests would cause the R/W head to change direction and proceed progressively in the opposite direction; in which the head would reach the RBA storage locations of the last 3 requests consecutively.

FIGS. 3 and 4 show where in the service queue a new request with RBA value of 752 would be positioned, assuming that request is received when the queue is in the state shown in FIG. 3. In FIG. 3, the new request is shown above and outside the queue, and in FIG. 4, the new request is shown in its appropriate "elevator ordered" position in the queue.

3. Present Disk I/O Scheduling-Overview

Figure 5:
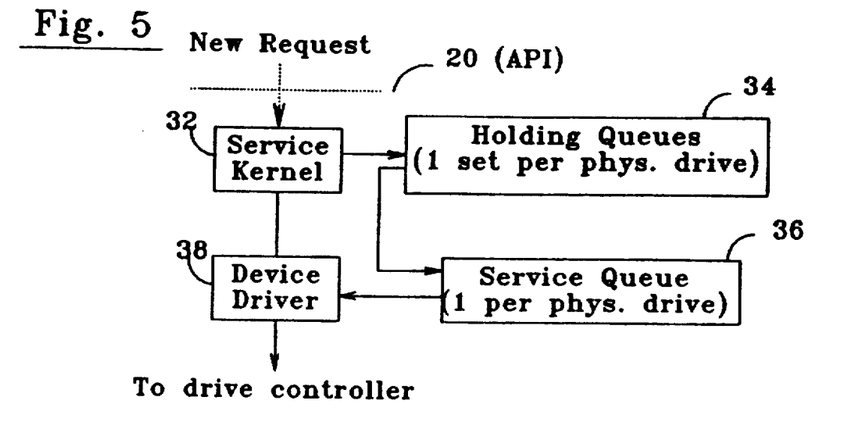
FIG. 5 schematically illustrates the present arrangement of holding and service queues for I/O requests designating a common disk drive.

As shown in FIG. 5, the present invention contemplates use of a modified service kernel 32 to maintain a set of (plural) holding queues 34 and a service queue 36 relative to each physical disk drive in the system. Service queue 36 differs from prior art service queue 24 in that its requests are serviced on a first in first out (FIFO) basis rather than in a sorted elevator sequence (in which requests are serviced in an order unrelated to the sequence in which they are entered into the queue).

Upon receiving a device ready indication from driver 38, service kernel 32 dispatches a request from the head end of service queue 36, and if this empties the service queue, the kernel seeks to transfer a request from holding queues 34 to the service queue. If at least one holding queue is then "ready" (not empty), the service kernel locates the highest priority such ready queue and transfers either one request or all requests from that queue to the service queue (in a manner described in further detail below). If the holding queues are all empty at the time, the service kernel will advance the next received request directly to the service queue.

4. Present Disk I/O Scheduling—Specifics

Figure 6:
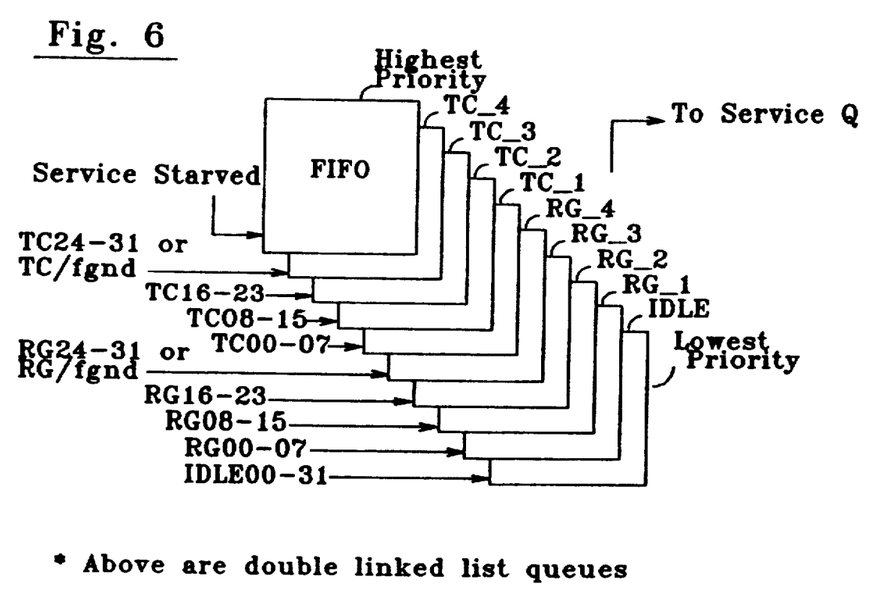
FIG. 6 illustrates a preferred arrangement of priority ranked holding queues in accordance with the present invention.
Figure 7:
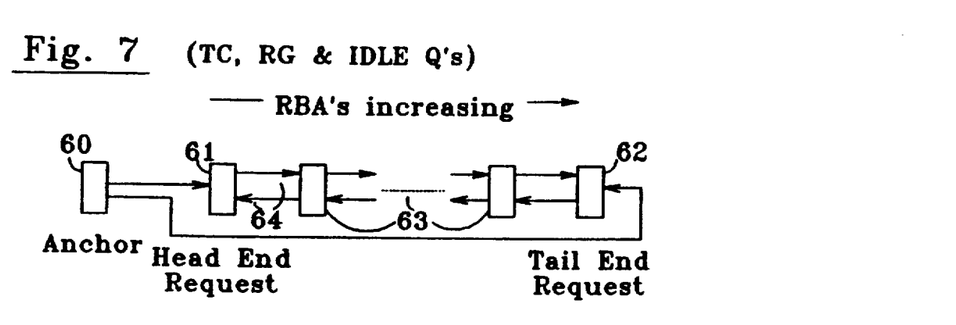
FIG. 7 illustrates the placement of I/O requests in progressively ascending RBA sequence in the TC, RG and IDLE holding queues shown in FIG. 6.
Figure 8:
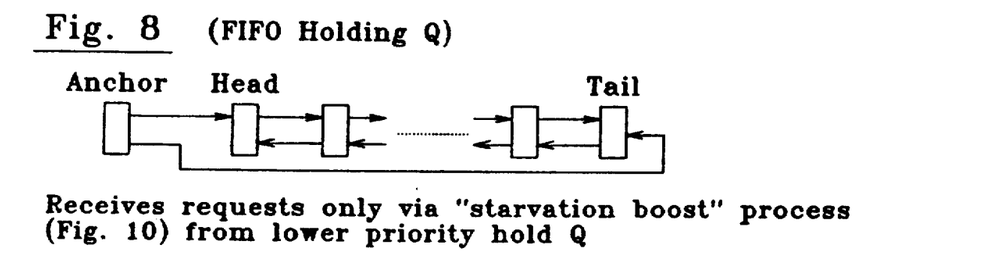
FIG. 8 illustrates the ordering of I/O requests in the FIFO holding queue shown in FIG. 6.
Figure 9:
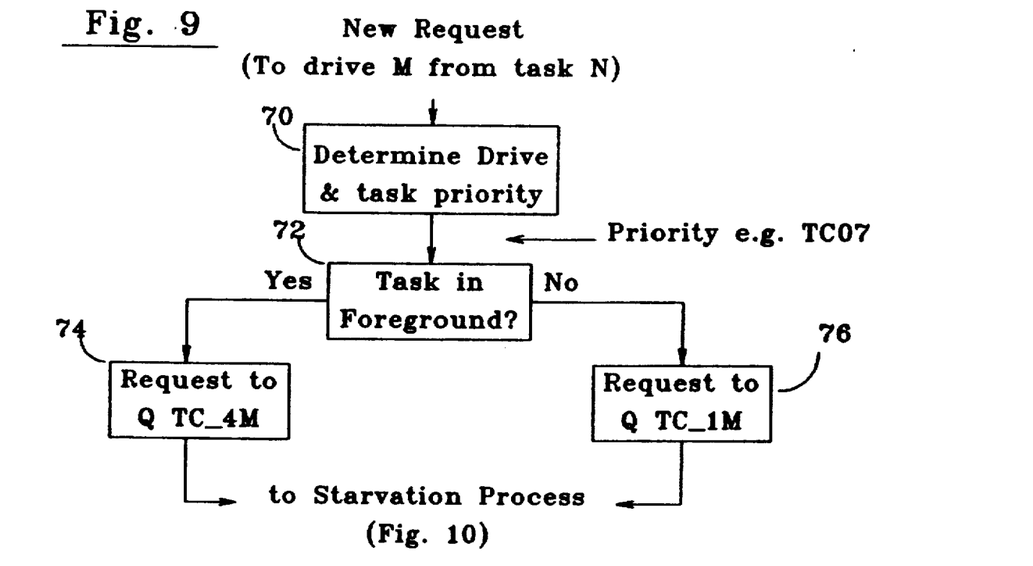
FIGS. 9 and 10 respectively illustrate request enqueueing and starvation advancement processes performed by the operating system service kernel relative to the holding queues shown in FIG. 6.
Figure 10:
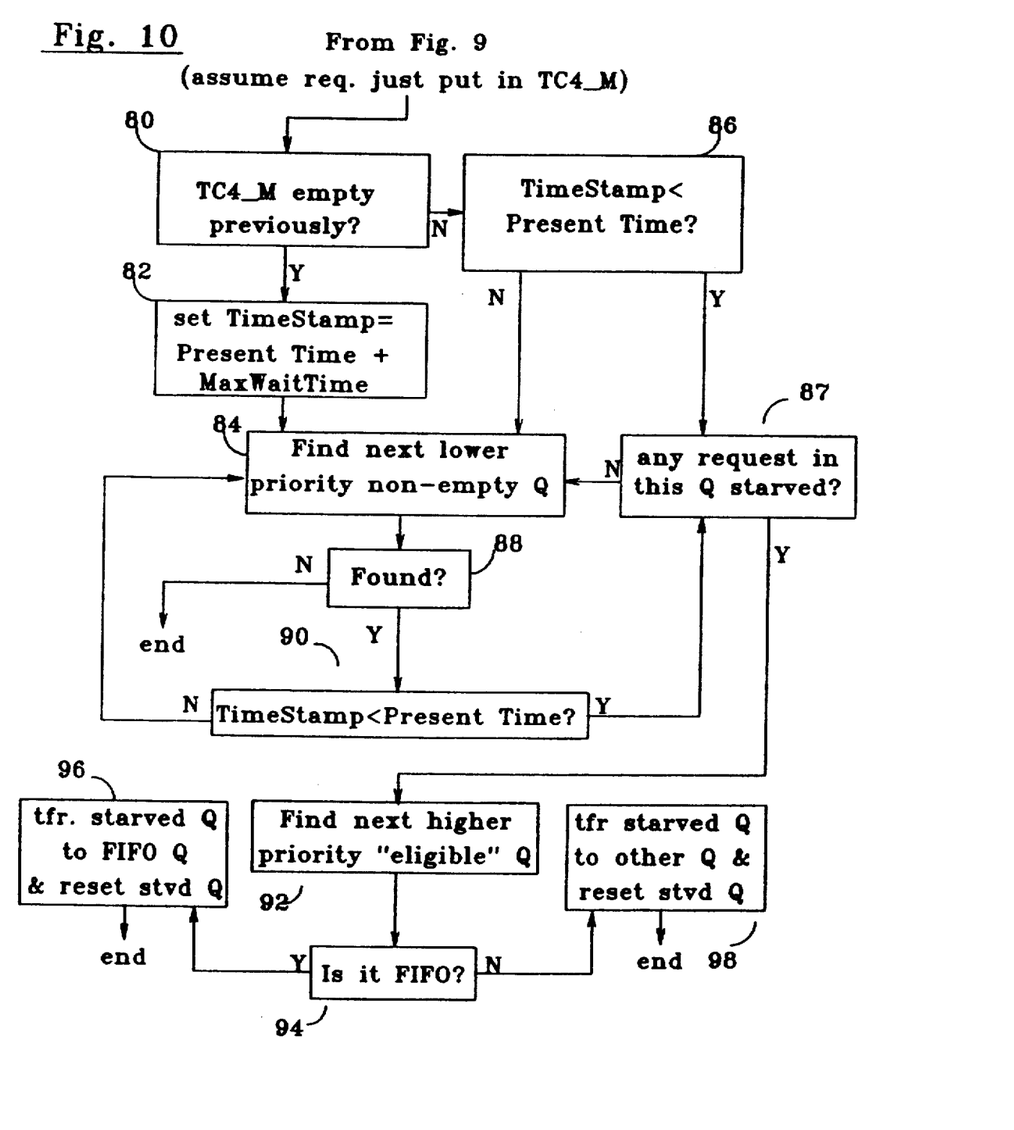
Figure 11:
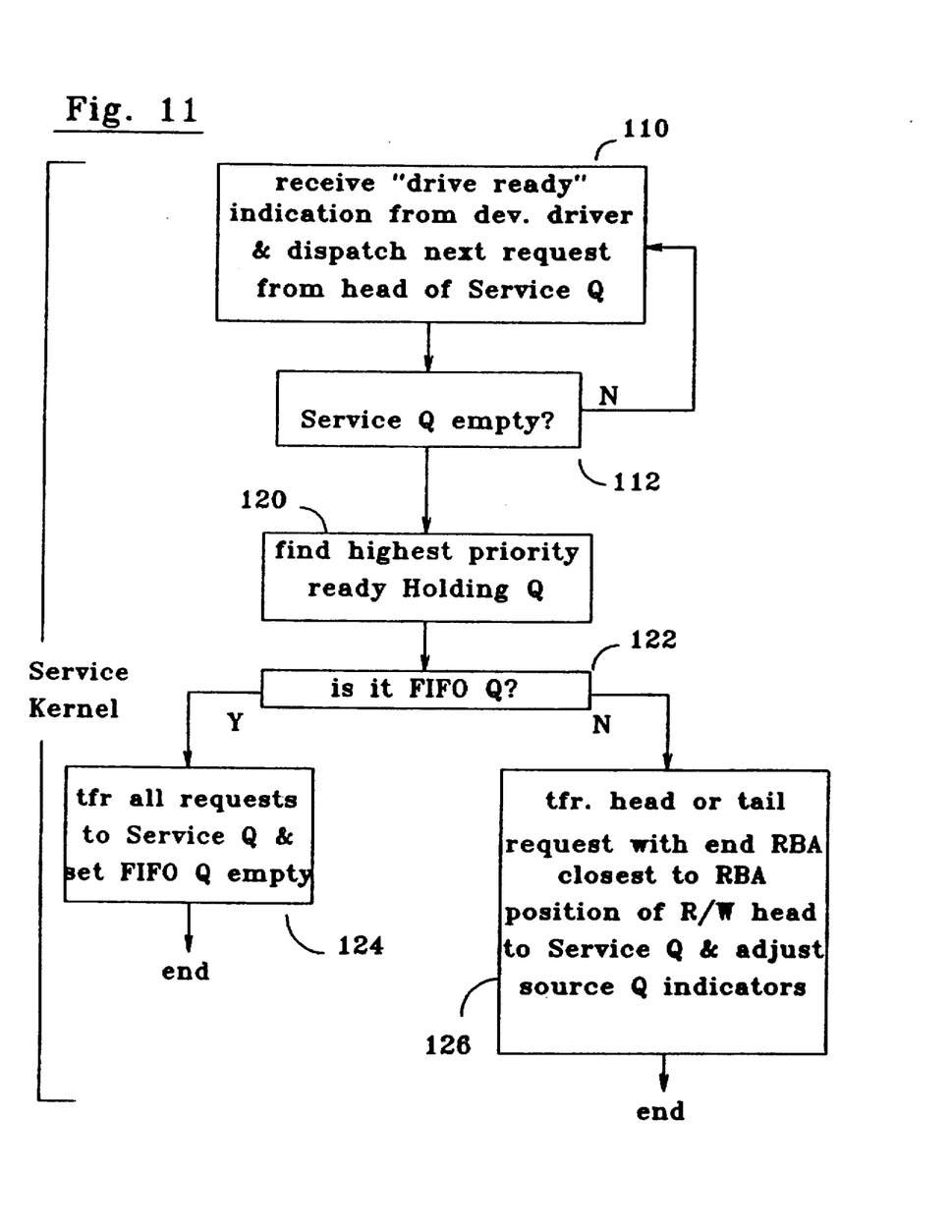
FIG. 11 illustrates the transfer process conducted by the service kernel, for transferring requests from the holding queues of FIG. 6 to the service queue shown in FIG. 5, in response to signals from the device driver which attends to requests in the service queue.

FIGS. 6–11 show the organization and usage of a preferred configuration of holding queues in accordance with the invention. The holding queues and their task priority associations are shown in FIG. 6. Ordering of requests within individual holding queues is shown in FIGS. 7 and 8. Operations performed by the service kernel to enter newly received requests into holding queues are shown in FIG. 9. Service starvation and priority boosting operations performed by the service kernel relative to the holding queues are shown in FIG. 10. FIG. 11 shows operations performed by the service kernel for conditionally transferring requests from the holding queues to the service queue.

Referring to FIG. 6, the holding queues are double linked lists (described further in FIGS. 7 and 8) having the following designations, in descending priority order: FIFO, TC_4, TC_3, TC_2, TC_1, RG_4, RG_3, RG_2, RG_1, and IDLE. The FIFO holding queue receives requests only from lower priority queues during a starvation priority boosting procedure described later with reference to FIG. 10. The other holding queues have priorities corresponding to task priority classes and receive new requests associated with tasks having corresponding priorities. Queues having priorities intermediate those of the FIFO and IDLE queues are also eligible to receive requests from lower priority queues during the starvation boosting process to be described.

In OS/2 systems, tasks have priority classifications assigned by their programmers. Up to 96 distinct classes of task priority are assignable, falling into three major groups as follows: a group of 32 time critical task classes (TC31-TC00, in descending priority order), a group of 32 regular/intermediate priority task classes (RG31-RG00, in descending priority order), and a group of 32 lowest/idle priority task classes (IDLE3-1-IDLE 00, in descending order).

Queues TC_n (n=1-4) receive new requests associated with tasks classified TC31-TC00 in the four sub-groupings shown in FIG. 6. Thus, TC_4 receives new requests associated with task priorities TC24 through TC31; TC_3 receives new requests associated with task priorities TC16-TC23; TC_2 receives requests associated with priorities TC08-TC15; and TC_1 receives requests associated with TC00-TC07. Requests associated with foreground tasks with time critical classification are given favored treatment in relation to requests associated with non-foreground tasks of the same priorities. Thus, new requests associated with foreground tasks in any of the classes TC00-TC31 (TC/fgnd in FIG. 6) are all directed to TC_4 (the highest priority time critical queue).

Similarly, queues RG_n (n=1-4) receive new requests associated with tasks in the intermediate (regular priority) range RG31-RG00, in four major sub-groupings shown in FIG. 6. RG_4 receives new requests associated with task priorities RG24 through RG31; RG_3 receives new requests associated with priorities RG16-RG23; RG_2 receives requests associated with RG08-RG15; and RG_1 receives requests associated with RG00-RG07. Requests associated with foreground tasks with intermediate/regular classification are given favored treatment. Thus, new requests associated with foreground tasks in any of the classes RG00-RG31 (RG/fgnd in FIG. 6) are all directed to RG_4 (the highest priority RG queue).

FIG. 7 shows how requests are positioned in each of the holding queues other than the FIFO queue. As shown in FIG. 7 each queue is constructed as a double linked list referred to an anchor table 60. Anchor 60 is located at an address in system memory which remains fixed at least during a given processing session. When the queue contains at least 2 requests, anchor 60 contains pointers for locating the head and tail end requests 61 and 62. Requests at intermediate positions are suggested at 63, and the double linkage between successive request positions is suggested at 64. It is understood that request positions 61–63 may be arbitrarily located in system memory. Requests are positioned in the queue with their RBA values progressively increasing or ascending, in the direction of the tail end, as shown in the drawing.

In addition to providing indications for quickly (directly) locating head and tail end requests, the anchor provides other key information for quickly ascertaining the queue status (without having to locate and examine the individual request packets). This includes a MaxWaitTime function representing a timeout factor for starvation service (discussed later re FIG. 10), a TimeStamp function which when the queue receives a request after being empty is the Present Time Of Day increased by the MaxWaitTime factor, and a BoostQ function which may be used to indicate a queue to which into shift contents of the present queue when a starvation condition is detected as described later. In addition to the individual queue anchors, an I/O structure table (IOStruc) is maintained in memory relative to each physical disk drive for indicating the set of all queues associated with that drive, processing status of the associated device driver, the RBA position of the R/W head of the drive after it completes handling of the request most recently dispatched from the service queue, and the identity of the highest priority non-empty holding queue.

As shown in FIG. 8, the FIFO holding queue is also constructed as a double linked list queue, with an anchor indicating indicating key parameters including locations of end requests. The FIFO queue receives requests only from lower priority queues as a result of starvation handling discussed later (FIG. 10). Since requests are transferred to this queue in blocks during starvation boosting, requests in the FIFO queue when there are any consist of one or more blocks within each of which requests (when there are more than one) have increasing RBA's from the head end to the tail end).

Operations performed by the operating system service kernel, upon receiving an I/O request directed to a given disk drive M, are indicated in FIG. 9. In the example shown, the request is assumed to be associated with a task N having priority class TC07. From information in the request packet, the service kernal ascertains the targeted drive and the associated task priority (step 70). Next, the kernal ascertains if the associated task is or is not being processed in the operating system foreground (step 72), again from information in the request packet. If the task is in the foreground, operation 74 is performed to place the request in holding queue TC_4M (the highest priority time critical holding queue associated with drive M). If the task is not in the foreground, operation 76 is performed to place the request in queue TC_1M (the time critical holding queue associated ordinarily with tasks in classes TC00 through TC07).

As noted earlier, requests in the priority classed holding queues are ordered positionally in each queue with their RBA's increasing towards the tail end of the queue. Accordingly, it is understood that such ordering is maintained in request entry operations 74 and 76. Upon completing operation 74 or 76, the service kernel performs the starvation check and selective boosting process described next with reference to FIG. 10.

In the starvation check process (operations 80–90 in FIG. 10), the service kernel first determines at 80 if the holding queue into which it has just entered a request (assumed to be TC_4M relative to the example of FIG. 9) was empty before the entry (by examining status information in the respective queue anchor). If the queue was previously empty, no further starvation checking is needed relative to this queue, and a new TimeStamp (equal to the Present Time plus the MaxWaitTime factor for this queue) is calculated and placed in the respective queue anchor (operation 82). At such times, the kernel proceeds with operations beginning at 84 to try to find a next lower priority queue needing starvation service.

If the kernel finds in operation 80 that the queue in which a request was just entered was not previously empty, it compares the respective anchor TimeStamp with the Present Time to determine if the timeout factor associated with the MaxWaitFunction has elapsed (operation 86). If the TimeStamp is greater than the present time, the timeout has not ended, so no further checking is needed, and the kernel proceeds to operation 84 for checking lower priority queues. If the TimeStamp is less than Present Time (Y at step 86), this means that the MaxWaitTime timeout has been passed and operation 87 is performed to check the individual request packets in the queue for starvation conditions.

This further checking of individual request packets in the queue is needed because the TimeStamp initially recorded is associated with entry of a request into a previously empty queue (operation 82) and the request so entered could have been transferred at any time to the service queue (refer to discussion of FIG. 11 below) without the associated TimeStamp being changed. Thus, the anchor TimeStamp might not reflect the true status of the queue (i.e. the age of its "oldest" request). and Each request packet has an individual TimeStamp entry which is the sum of the Time of its entry and the MaxWaitTime. If these individual TimeStamps are all not less than Present Time (N exit at operation 87) the queue is not starved and the kernel proceeds to operation 84 (at such times, the kernel sets the anchor TimeStamp value equal to that of the oldest/smallest individual TimeStamp value). If any of the individual TimeStamps is less than Present Time (Y exit at operation 87), its timeout has passed and the queue is considered to be in a "starved" condition. The service kernel then performs the boosting process of operations 92 and higher to transfer the contents of the starved queue to a next higher priority "eligible" holding queue.

An "eligible" holding queue other than the FIFO queue (which is "always eligible") is one which is either empty or presently contains requests whose RBA's are all either higher than the RBA of the tail end request in the starved queue or lower than the RBA of the head end request in that queue. Furthermore, the operation 92 search for a "next higher priority eligible queue" begins at a "boost target queue" designated in the anchor of the starved queue (this permits the system to skip over adjacent priority queues when boosting a starved queue).

Depending upon whether the next higher priority eligible queue found in operation 92 is the FIFO holding queue or another (intermediate priority) queue (Y or N, respectively at decision 94), the system transfers (boosts) the contents of the starved queue respectively to the FIFO queue or other found queue (operation 96 or 98, respectively) and resets the starved queue to empty. If the eligible queue to which the requests in the starved queue are transferred was not empty before the transfer, the starved queue requests are concatenated in a block to one end of that eligible queue. If the respective eligible queue is the FIFO queue, the starved queue requests are concatenated to the tail end of the FIFO queue. If the respective eligible queue is other than the FIFO queue, the requests in the starved queue are concatenated to whichever end of the eligible queue is appropriate for keeping the sequence of RBA's in the respective eligible queue progressively increasing from head end to tail end after the transfer (per FIG. 7).

It should be understood that since the queues are double linked lists, block transfer 96 or 98 can be accomplished simply by transferring head and/or tail end pointer information from the anchor of the starved queue to the anchor of the selected eligible queue, and if necessary, modifying request packets at a position of concatenation in the eligible queue to cross-link to each other. If the eligible queue is empty before the transfer, head and tail pointers are transferred from the starved queue's anchor to the eligible queue's anchor and no request packets are modified.

If the located eligible queue is not empty before the transfer, and it is the FIFO queue, the tail pointer in the starved queue anchor replaces the tail pointer in the FIFO queue's anchor, and request packets at the position of concatenation (what was the tail end of the FIFO queue before the transfer) are modified to cross-link to each other (i.e. the request packet which was at the tail end of the FIFO queue before the transfer and the packet which was at the head end of the starved queue are so modified).

If the located eligible queue is other than the FIFO queue, and was not empty before the transfer, a selected end pointer (head or tail) in the starved queue's anchor replaces a respective end pointer in the eligible other queue's anchor, and the request packets which become newly positioned next to each other, at the position of concatenation in the eligible other queue, are modified to cross-link to each other. Thus, if starved requests are concatenated to the head end of the eligible other queue (all starved request RBA's less than RBA's of all requests previously in the other queue), the head end pointer in the starved queue's anchor becomes the new head end pointer in the anchor of the eligible other queue, and the requests which previously were the tail end and head end requests respectively in the starved and other queue are modified to cross-link. Conversely, if starved requests are concatenated to the tail end of the other queue (all starved request RBA's greater than those of all requests previously in the other queue), the tail end pointer in the starved queue's anchor replaces the previous tail end pointer in the other queue's anchor and the respective previous head end request of the starved queue and tail end request of the other queue are modified to cross-link.

The reason for maintaining progressively increasing RBA's, when concatenating starved requests to a nonempty eligible queue of intermediate priority, is to allow for selection of a request from one end of the respective queue for transfer to the service queue in accordance with a head proximity determination (refer to following discussion of FIG. 11).

FIG. 11 shows how requests are transferred from holding queues to the service queue. Upon receiving a "drive ready" indication from the device driver relative to a disk drive (at 110), which is given by the latter when the drive is ready for an I/O operation, the service kernel dispatches (dequeues) the head end request from the associated service queue for initiating a respective I/O operation. If the service queue is empty after dispatching that request (Y at decision 112), the kernel proceeds to try to find the highest priority ready (nonempty) holding queue and if it finds such to transfer one or more requests from it to the service queue (operations 120 and higher).

If not all holding queues are empty, the service kernel determines if the FIFO queue is not empty; i.e. if it is the highest priority ready queue. If the FIFO queue is ready (Y at decision 122), all of its requests are transferred in a block to the service queue in their existing RBA order and the FIFO queue is reset to empty (operation 124). If the highest priority ready queue is other than the FIFO queue (N at decision 122), a single request is transferred from the head or tail end of that other queue to the service queue and indicators in the other queue are modified to (indicate a new head or tail end request position (operation 126).

Selection of the head or tail end request in operation 126 is made according to a proximity determination relative to the present position of the read/write head in the associated disk drive. The "end RBA's" in the head and tail end requests ("end RBA's" are the sums of RBA's and designated transfer block lengths in respective request packets) are compared to the end RBA of the request last dispatched to the disk drive (in operation 110), the value of the latter end RBA being recorded in the associated IOStruc table and effectively serving as an indication of the present position of the read/write head. The head or tail end request with the RBA closest to the read/write head position is transferred to the (head) end of the service queue.

I claim:

1. In a multitasking data processing system containing processor, memory and disk storage subsystems, said disk storage subsystem containing one or more disk drives and one or more disk drive controllers, said system being adapted for enabling said processor to perform multiple tasks concurrently, each task having an associated priority classification determining the order of its handling by said processor, said system being enabled further to initiate I/O operations called for in I/O requests issued by tasks that are being performed by said processor, said I/O operations including disk I/O operations to transfer programs and data between said memory and individual disk drives in said disk storage subsystem in accordance with I/O requests issued by said tasks that are directed to said disk drives; each I/O request directed to a said disk drive designating the respective drive, a priority classification corresponding to the priority classification of the associated task, and the location of an address block on a disk on the respective drive that represents a source or destination disk storage location relative to which an I/O transfer is to be conducted; disk I/O operation scheduling means, for enabling said processor to efficiently schedule disk I/O operations called for by I/O requests that are directed to said one or more disk drives, said scheduling means comprising:

one or more sets of request storing queues maintained by said processor in said memory subsystem exclusively for storing I/O requests issued by said tasks and directed to said one or more disk drives; each set of queues being associated with a different one of said one or more drives and serving exclusively to store requests directed to the associated drive; each said set of queues comprising a service queue and plural holding queues; the holding queues serving to hold requests that are to be transferred to the service queue, and the service queue serving to hold requests that are to be applied to the associated drive; the holding queues in each set being assigned different priorities determining the order in which requests concurrently held therein are transferred to the service queue in the same set;

device driver means coupled to said service queues in each said set for transferring requests from each said service queue to the respective disk drive, via the drive controllers that control the respective drive, the requests transferred from each service queue being transferred on a First In First Out (FIFO) basis;

first request transfer means coupled to said holding queues for transferring each newly issued I/O request directed to one of said disk drives into a selected holding queue in the set of queues associated with that drive; said selected holding queue having an assigned priority bearing a predetermined relation to the priority classification of the respective request and being chosen by said first transfer means as a function of a priority classification indicated with the respective request; and second request transfer means coupled to said queues in each said set for selectively transferring requests from the non-empty holding queues in each set to the service queue in the same set in accordance with the priorities assigned to the respective non-empty holding queues; whereby requests concurrently held in said holding queues are transferred to the service queues in respective sets in a priority sequence corresponding to the relative priority classification rankings of the tasks which issued the respective requests.

2. Disk I/O operation scheduling means in accordance with claim 1, wherein:

said device driver means includes means for detecting when said service queue in a said set is empty and responsive to each such detection for providing an associated empty indication to said second request transfer means; and said second request transfer means includes means responsive to each said empty indication for detecting when the respective holding queues in the set associated with the respectively empty service queue are not all empty, and means responsive to said detection that the respective holding queues are not all empty for transferring at least one request from the highest priority one of said respective not empty holding queues to the respective empty service queue.

3. Disk I/O operation scheduling means in accordance with claim 2, wherein said tasks have priority classifications ranging over a series of classifications including first and second classifications, said second classification having a lower priority than said first classification, and wherein said holding queues in each said set of queues comprises:

a highest priority holding queue;
one or more first priority holding queues; and
one or more second priority holding queues; and wherein:

said first request transfer means is adapted to store requests associated with tasks having said first and second priority classifications respectively in said first priority and second priority holding queues, in the sets of queues associated with the disk drive to which respective requests are directed, and wherein:

said second request transfer means is responsive to each said service queue empty indication to transfer a request from said highest priority holding queue to said service queue if the highest priority holding queue is not empty, or to transfer a request from a selected one of said one or more first priority holding queues to the service queue if the highest priority queue is empty and the first priority holding queues are not all empty, or to transfer a request from the one or more second priority holding queues to the service queue if the highest priority and first priority queues are all empty and the second priority queues are not empty.

4. Disk I/O operation scheduling means in accordance with claim 3, wherein said first request transfer means includes:

starvation checking means for detecting service starvation conditions in said first and second priority holding queues, said conditions occurring when a request has been held in the respective holding queue for more than a predetermined time, and starvation boosting means responsive to detection of a said starvation condition for transferring requests from the holding queue in which said condition is detected to a selected higher priority holding queue.

5. Disk operation scheduling means in accordance with claim 2, wherein the priority classifications of said processed tasks comprise at least first and second groups of time critical priority classes and at least first and second groups of regular priority classes, said priority classes having the following relative priority ranking in descending order of priority:

first time critical class;
second time critical class;
first regular class;
second regular class;
and wherein said holding queues in each said set of holding queues comprises a highest priority holding queue, first and second time critical priority holding queues and first and second regular priority holding queues having the following relative priority rankings for service in descending order:
highest priority,
first time critical priority,
second time critical priority,
first regular priority,
second regular priority;
and wherein said first request transfer means is adapted to store requests issued by said tasks relative to any said disk drive, in a selected holding queue in the set of holding queues associated with the respective drive, wherein the selected holding queue is chosen in accordance with the following schedule:
store requests associated with foreground tasks having priority classifications in either said first time critical or second time critical class groups in said first time critical priority holding queue in the associated set;

store requests associated with foreground tasks having priority classifications in either said first regular or second regular class groups in said first regular priority holding queue in the associated set; and store requests associated with non-foreground tasks having priority classifications in said first time critical, second time critical, first regular and second regular class groups respectively in said first time critical, second time critical, first regular and second regular holding queues in the associated set;

and wherein said second request transfer means is responsive to each said service queue empty indication to transfer a request from the highest priority non-empty holding queue to said service queue when at least one of said holding queues is not empty.

6. Disk operation scheduling means in accordance with claim 5, wherein each of said time critical and regular priority holding queues in each said set is constructed as a double linked list queue.

7. Disk operation scheduling means in accordance with claim 6, wherein:

each request stored in said holding queues contains relative block address (RBA) information, denoting a relative block storage address in said associated disk drive, relative to which an I/O operation defined by the request is to be performed;

said first request transfer means is operative when entering requests into said time critical and regular priority holding queues to position the entered request relative to other requests in the same holding queue so as to maintain the RBA values of all requests in the queue positionally ordered in a progressively ascending numerical sequence relative to one end of the respective queue;

said device driver means provides a head RBA indication, with said service queue empty indication, that implies the current block address position of the read/write (R/W) head assembly in said associated disk drive; and said second request transfer means is operative, when transferring a request from any of said first and second priority holding queue to the associated service queue, to select a request to be so transferred from one or the other end of the respective holding queue, on the basis of a proximity calculation determining which end request has an RBA value closest to the said head RBA value implying the current position of said R/W head assembly in said associated disk drive.

8. Disk operation scheduling means for a multitasking data processing system containing CPU, memory and disk storage subsystems, said disk operation scheduling means enablins said CPU subsystem to schedule I/O operations of said disk storage subsystem in accordance with disk I/O requests issued by tasks being processed by said CPU subsystem, said disk operation scheduling means comprising:

a set of plural queues associated uniquely with a single disk drive in said storage subsystem, said queues serving exclusively to store disk I/O requests designating I/O operations to be performed between said associated disk drive and said memory subsystem; said set of queues comprising a service queue and plural holding queues, said service queue having a single linked list queue structure, said holding queues having double linked list queue structures and predetermined relative priorities for having requests stored therein transferred to said service queue, said relative priorities of said holding queues being associated with priority classifications of tasks processed by said CPU subsystem, said holding queues further including a FIFO (First In First Out) holding queue having a priority for having requests stored therein transferred to the service queue which is not associated with any task priority and is higher than the priorities of the other holding queues;

device driver means coupled to said service queue for transferring servicing requests from said service queue to the controls of the associated disk drive on a FIFO basis, each request so transferred causing said drive controls to initiate an I/O operation designated by the request relative to said associated disk drive;

first request transfer means coupled to said holding queues for selectively entering disk I/O requests designating said disk drive into selected ones of said holding queues, as said tasks are issued by said tasks, each request containing a priority class indication of an associated task, determining the holding queue into which that request is entered, and an RBA (relative block address) value denoting a storage position on said disk drive relative to which a respective I/O operation is to be performed;

said first request transfer means including request positioning means for positioning each said request entered into a said holding queue, other than said FIFO holding queue, in a selected position in the respective holding queue chosen as a function of RBA information in the respective entered request, and RBA information in requests stored in the respective holding queue prior to that entry, so as to maintain the requests in the respective holding queue positionally ordered with their RBA's forming a progressively increasing value sequence relative to one end of the respective holding queue;

second request transfer means, coupled to said holding and service queues, for detecting when said service queue is empty and, upon each such determination, selectively transferring one or more requests from a highest priority non-empty one of said holding queues to said service queue; said second transfer means transferring all requests from said FIFO holding queue to said service queue if the FIFO holding queue is not empty, and otherwise transferring a single request from a next highest priority non-empty holding queue if the FIFO holding queue is empty and another holding queue is not empty; said single request so transferred being selected from either the head or tail end of the respective next highest priority non-empty holding queue on the basis of a proximity determination made by said transferring means; said proximity determination being based on a comparison of the RBA values in the requests at the head and tail ends of the respective next highest priority non-empty holding queue with the RBA value of the request last transferred from said service queue to said device driver; and said first request transfer means including starvation checking means and starvation boosting means operating as requests are entered into said holding queues; said checking means determining if a service starvation condition exists in either the holding queue into which a said request is being entered or a in a lower priority holding queue, and said boosting means responding to detection of a starvation condition by transferring all requests from the queue in which said starvation condition is detected to a selected higher priority holding queue; said selected higher priority queue being either the next highest priority empty one of said holding queues having priority less than said FIFO holding queue or being said FIFO holding queue if all holding queues of intermediate priority are not empty; said transferred requests when transferred to said FIFO holding queue being concatenated to the tail end of said queue if said FIFO holding queue is not empty when the transfer is made.

* * * * *